A. ZITZMANN.
TERM RECORDER.
APPLICATION FILED FEB. 2, 1916.

1,198,308.

Patented Sept. 12, 1916.
3 SHEETS—SHEET 1.

Witnesses:
Georg Reil
Frank Bohr

Inventor
August Zitzmann

A. ZITZMANN.
TERM RECORDER.
APPLICATION FILED FEB. 2, 1916.

1,198,308.

Patented Sept. 12, 1916.
3 SHEETS—SHEET 2.

Witnesses:
George Reif
Frank Bohr

Inventor
August Zitzmann

A. ZITZMANN.
TERM RECORDER.
APPLICATION FILED FEB. 2, 1916.

1,198,308.

Patented Sept. 12, 1916.
3 SHEETS—SHEET 3.

UNITED STATES PATENT OFFICE.

AUGUST ZITZMANN, OF ZURICH, SWITZERLAND.

TERM-RECORDER.

1,198,308.  Specification of Letters Patent.  Patented Sept. 12, 1916.

Application filed February 2, 1916. Serial No. 75,881.

*To all whom it may concern:*

Be it known that I, AUGUST ZITZMANN, citizen of the Kingdom of Bavaria, residing at Zurich, in the county of Zurich and State of Switzerland, have invented certain new and useful Improvements in Term-Recorders, of which the following is a specification.

My invention relates to improvements in deed-boxes or devices for recording various terms as for instance: summonses, times of delivery, terms of payment, time allowed for notices, time-limits of offers, meeting days for bills, demands of payment and all other affairs of business, with a simultaneous presentation of all scriptures in original documents or in their complete copies which are necessary for disposal of the business in question.

The objects of my improvements are: first, to provide a precise and correct safe-keeping of any document for any particular day of the 366 days of the year, by using 43 drawers only; second, to keep each document safe and under control without it being necessary to open any drawer; third, to avoid the necessity of re-arranging at the commencement of each new month the contents of each of the 12 monthly drawers commonly used; fourth, to record visibly each term of each document kept in the drawer and of each coming month of the year; fifth, to insure, that the documents kept in the device be taken out at the right time, and sixth, to record each mistake and each omission which may have occurred in the working of the device. I attain these objects by the mechanism shown in the accompanying drawings, in which—

Figures 1, 2:
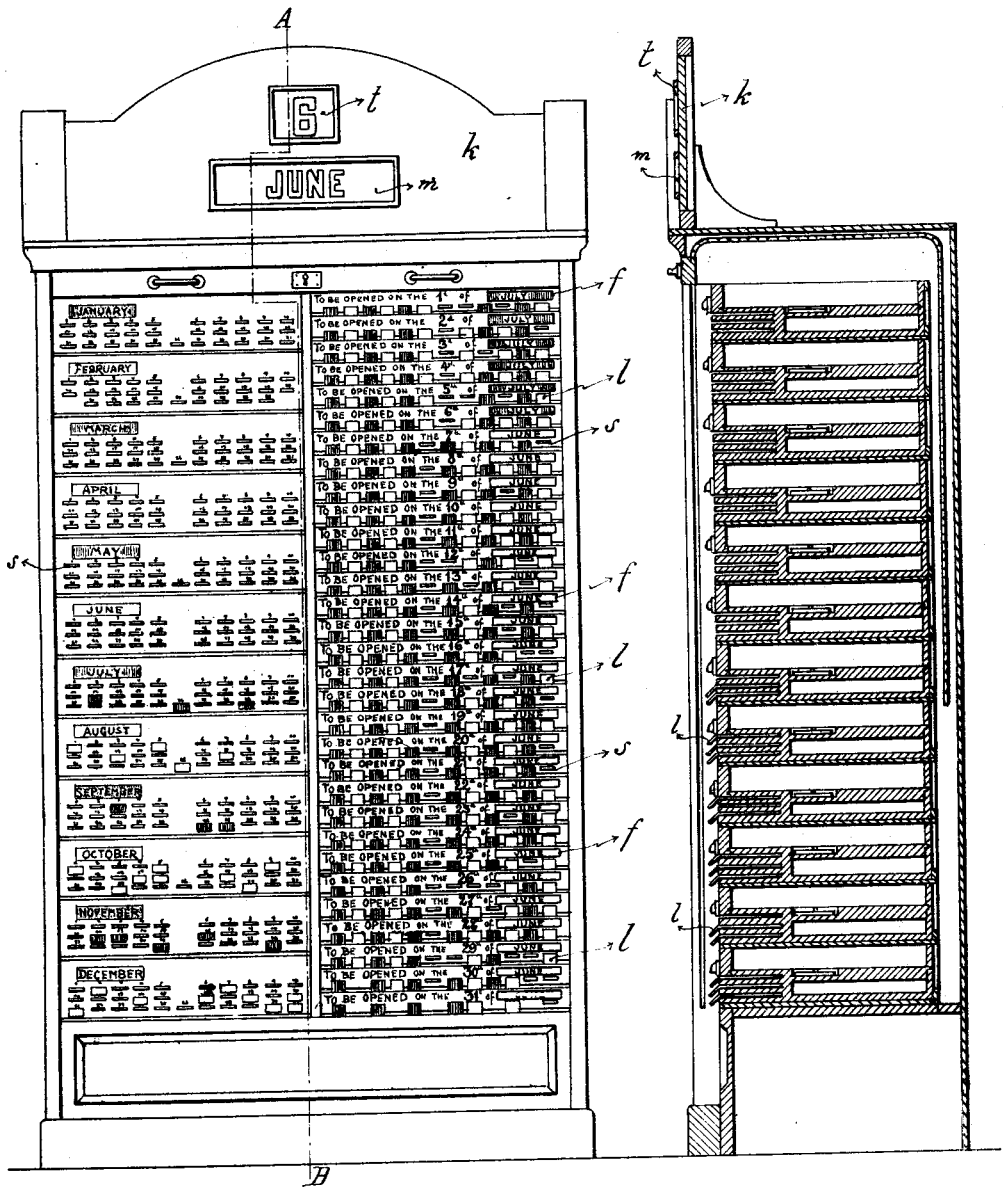
Figure 3:
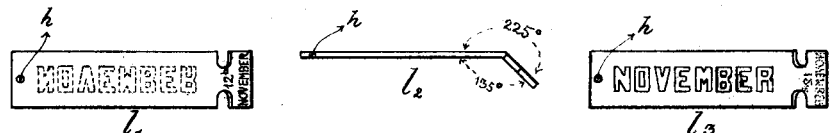
Figure 4:
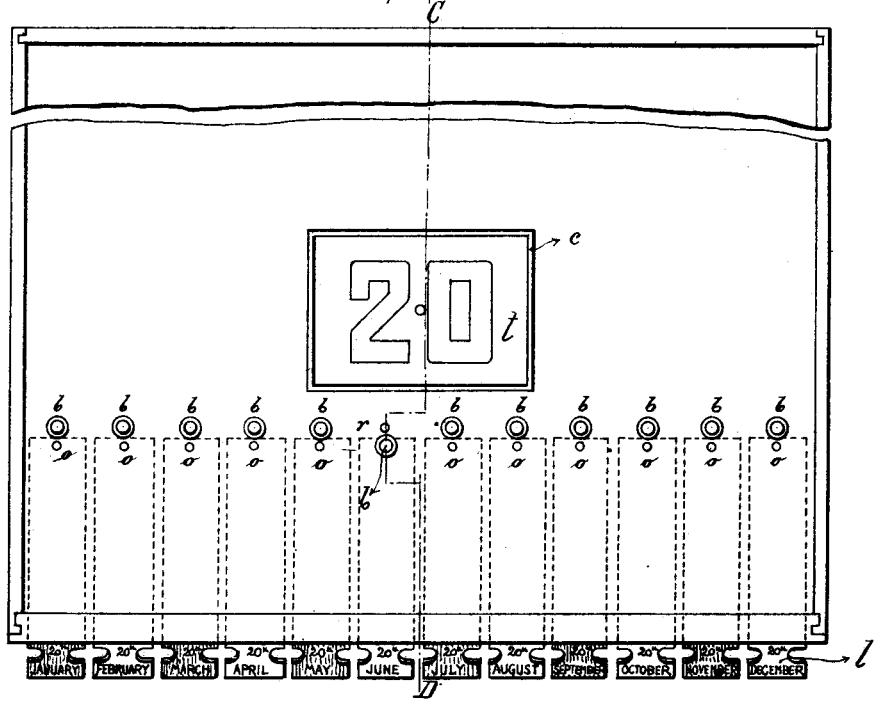
Figure 5:
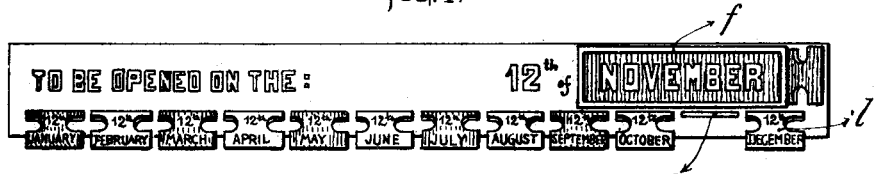
Figure 6:
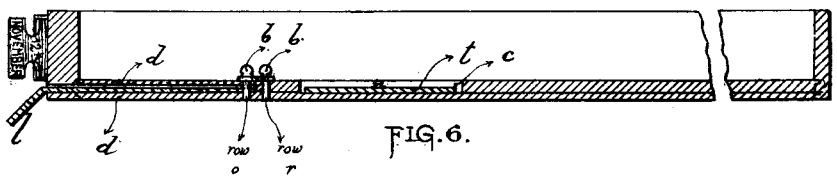
Figure 7:
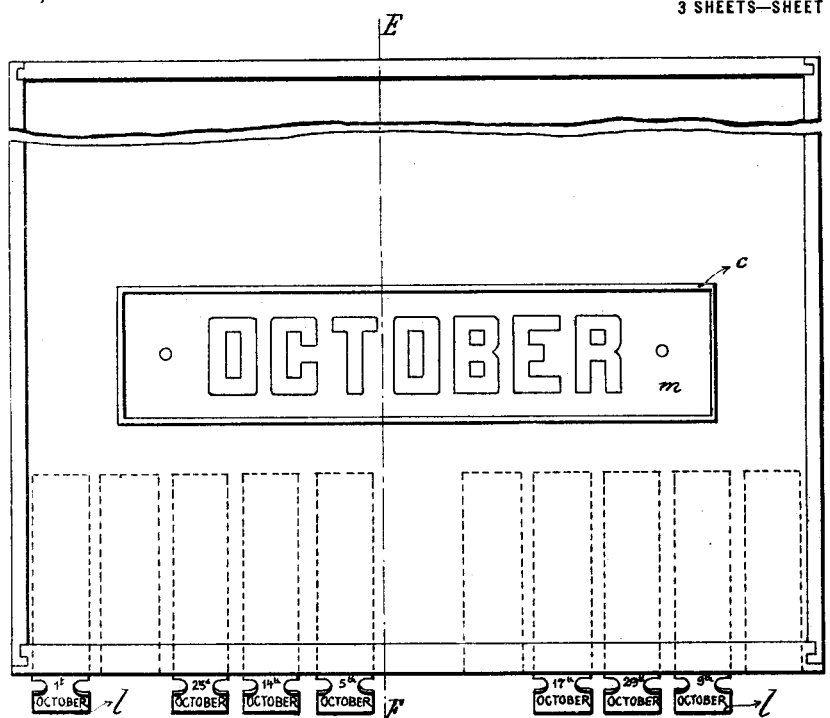
Figure 8:
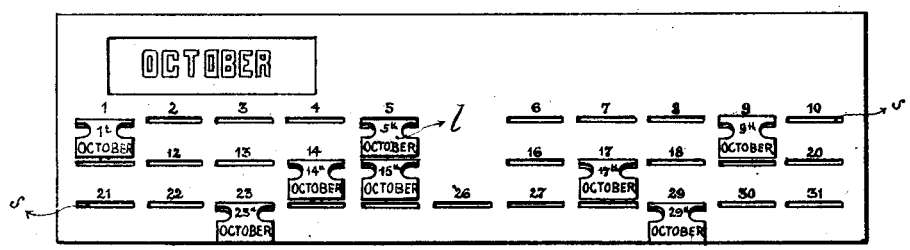
Figure 9:
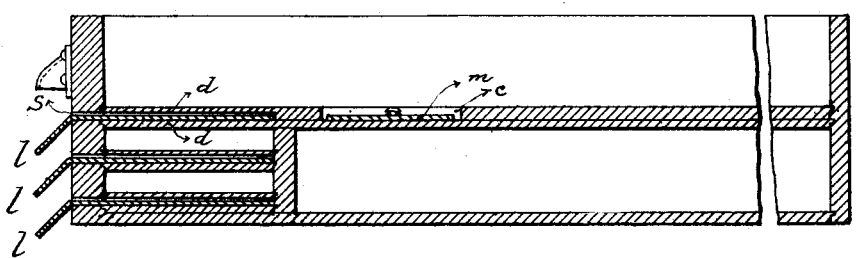

Figure 1 is a front elevation. Fig. 2 is a vertical section of the device on the line A—B in Fig. 1. Fig. 3 is a top view of a control-label ($L_1$), a side view of a control-label ($L_2$), a bottom view of a control-label ($L_3$). Fig. 4 is a top view of one of the 31 daily drawers. Fig. 5 is a front view of one of the 31 daily drawers. Fig. 6 is a vertical section of one of the 31 daily drawers on the line C—D in Fig. 4. Fig. 7 is a top view of one of the 12 monthly drawers. Fig. 8 is a front view of one of the 12 monthly drawers. Fig. 9 is a vertical section of one of the 12 monthly drawers on the line E—F in Fig. 7.

Similar letters refer to similar parts throughout the different views.

The device consists of a normal box (Figs. 1 and 2) divided in two halves the right side of which contains 31 daily drawers marked by continuous numbers from 1 to 31, while the left side is occupied by 12 monthly drawers marked by the names of the calendar-months January–December. Each of the 31 daily drawers bears on its front face (Figs. 1 and 5) the inscription: "To be opened on the:" and the standing number of the day for which it is prescribed. Thus we read on the surface of the first daily drawer: "To be opened on the: 1st of"; on the surface of the second drawer: "To be opened on the 2nd of", etc. On the right of this inscription there is a metal frame $f$ (Figs. 1 and 5) in which a control label bearing the name of the calendar month can be put. Therefore the number of the day of any daily drawer is unchangeable whereas the name of the month on each daily drawer can be changed. These control labels bearing the names of the calendar months are executed in the form shown by Fig. 3. On the side view $L_2$ of the same figure we see that the handle of the label is bent from the plane of the flat surface of the label at an angle of 45 degrees, also that the side of the label forming with the handle an angle of 135 degrees bears in large letters the name of the calendar month ($L_3$ in Fig. 3), while the opposite side of the handle forming with the label an angle of 225 degrees bears in small letters the name of the same month and also the number of the daily drawer to which the label belongs ($L_1$ in Fig. 3).

Each of the 31 daily drawers is provided with a complete set (12 pieces) of control labels L (Figs. 1 and 4) for the whole year. In their normal position these labels are slipped into 12 horizontal slots $s$ (Figs. 1, 4, 5, 6,) in the front board of the drawer, so that they are completely hidden between the double-bottom $d$—$d$ (Fig. 6) of the drawer and only their handles project from the front board (Figs. 4, 5 and 6) showing the small inscriptions of the 12 calendar months and the number of the day pertaining to the drawer. The handles of the labels in the drawer 1 show the inscription: 1st January, 1st February and so on to 1st December; the handles of the labels in the drawer 2 bear the inscriptions: 2d January, 2d February and so on to 2nd December.

If the label "12th November" has been pulled out of its slot in the daily drawer 12 and put into the frame $f$ of the same drawer as Fig. 5 shows, the large inscription "November" appears in the opening of the frame $f$ while the small inscription on the handle (12th November) is turned against the front board and thus is no longer legible. It is unnecessary to remark that for February only 29 labels are provided and for April, June, September and November 30 each.

All control labels of those calendar months which bear an odd number i. e. January, March, May, July, September and November, are red (white letters on red background), those of the calendar months which have an even number i. e. February, April, June, August, October and December, are white (red letters on white background). Thus the handles of the labels put into the slots of the daily drawers form twelve vertical stripes alternating in red and white. (See Figs. 1, 4 and 5 where the red labels are shown by vertical shadings).

Each control label has in its back end a circular hole $h$ (Fig. 3) and the bottom of each daily drawer is provided with 12 similar corresponding holes in a row $o$ (Figs. 4 and 6) in each of which a bolt $b$ (Figs. 4 and 6) can be put. In this case the bolt goes through the hole of the double bottom of the drawer and through the hole of the control label so that the latter will be checked and cannot be removed out of its slot. The bolts $b$ (12 pieces in each daily drawer) are kept in a second row of holes $r$ (Figs. 4 and 6) and to check any control label it is only necessary to change its bolt from the back row $r$ into the front row $o$ (see Figs. 4 and 6, label "June").

The twelve monthly drawers (Figs. 1, 2, 7, 8 and 9) have not their own control labels but horizontal slots $s$ (Figs. 1, 8 and 9) in which the labels taken away from the daily drawers can be put. Each monthly drawer has as many slots as there are days in that month, thus the drawer January has 31, the drawer February 29 slots, etc.

On the top of the device there is a date box $k$ (Figs. 1 and 2) the boards of which bearing the numbers of days $t$ (Figs. 1, 2, 4, and 6) are kept in the daily drawers in such a way, that the board number 1 is kept in the drawer "To be opened on the 1st", the board number 2 in the drawer "To be opened on the 2d", etc. In the same way the boards with the names of the months $m$ (Figs. 1, 2, 7 and 9) are located in the monthly drawers, the board "January" in the monthly drawer January, the board "February" in the monthly drawer February, etc. It is therefore impossible to change the date in the date box $k$ without opening the daily drawer at the commencement of each day and the corresponding monthly drawer at the beginning of each month. These boards for the date box $k$ lie in a cavity $c$ (Figs. 4, 6, 7 and 9) in the inner bottom of the drawers so that they are in a fixed position and do not encroach upon the space required for the papers in the drawer.

The working of this device for recording terms is as follows:—At the commencement of a year all control labels in the daily drawers falling on a Sunday, a holiday or other non-working days will be checked in the manner described above. Two copies are made of every document to be brought out on a certain day. One of these is filed in the usual way, while the other copy, made purposely on a colored paper, will be put in that drawer which is marked with the number of the day or with the name of the month appointed for it. The daily drawers of the device having been prepared for "January" when the January label of each drawer has been pulled out of its slot $s$ and put into the frame $f$ on the front board of the same drawer, these drawers are then ready to receive documents for from 1st to 31st of January. Documents required at a later time than that which the daily drawers are temporarily marked for, must be deposited in the monthly drawer in which their terms fall. In order, however, to mark not only the month but also the very day on which such documents will be required, it is necessary to take the respective label of that month out of the respective daily drawer which bears the number of the day the document is required on, and put it into the slot of the monthly drawer which contains the document.

Fig. 1 shows the state of the device on the 6th of June, when the daily drawers of the forthcoming days of June (7th to 30th) are still prepared for the remaining days of June but the drawers 1st to 6th after having been opened and cleared of their contents are already marked for the next month July. If at this state of the device documents wanted on the 1st, 5th, 9th, 14th, 15th, 17th, 23rd and 29th of October are to be stored, they will all be put into the monthly drawer "October" but at the same time the control labels "October" will be taken off from the daily drawers bearing the day's date of maturity (i. e. the daily drawers 1st, 5th, 9th, 14th, 15th, 17th, 23rd and 29th) and put into the corresponding numbered slots of the monthly drawer "October" as is shown in Fig. 1 and on a larger scale in Fig. 8. The surface of the monthly drawer "October" indicates now not only that documents required in October are placed here, but also all days of October on which the documents in October are required, are clearly indicated.

If anybody places a document in the monthly drawer for a day which is a non-working day, he will be instantly warned because the relative control label in the daily drawer is locked and therefore cannot be put into the monthly drawer. In this case it will be necessary to choose a day before or a day after that originally intended and it is impossible to date any document for any day on which no work is to be done.

The necessity of clearing the contents of each drawer after its date has arrived is secured by the necessity of changing the date in the date box on the top of the device ($k$ in Figs. 1 and 2). As the board bearing the new date lies in the cavity $o$ (Figs. 4 and 6) of the drawer and is covered by the documents filed in the latter, this change of the date cannot be executed before the drawer of the day has been opened and before the documents kept in this drawer and required on this day have been taken out. As long as the date in the date box $k$ has not been changed, so long is there a visible and an unmistakable warning that the terms of this day have not been noticed. After the documents wanted on the 6th of June for instance, have been taken out, they can either be instantly disposed of or put back for a later date. In any case the drawer: "To be opened on the 6th of June" is emptied and must be marked for the 6th day of the next month i. e. July. For this purpose the control label "June" will be taken out of the front board frame $f$ (Figs. 1 and 5) in the front board and put back into its corresponding slot "June" of the same drawer while the next label "July" is moved from its slot into the frame $f$ changing the inscription of the drawer from: "To be opened on the 6th of June" into the inscription: "To be opened on the 6th of July". From this instant the drawer is ready to take all documents required on the 6th of July.

Because the month June bears an even number and therefore its control labels are white, all white labels "June" in the frames $f$ of the daily drawers (Fig. 1) form an unbroken vertical white stripe while the red labels of July in the same frames follow in an unbroken red stripe. The lower stripe of the current month diminishes every day by one label, the upper stripe of the other color and of the next month increases every day by one label. A color of a label not changed interrupts the continuity of the upper stripe and shows any error or omission. Fig. 1 shows the state of the device on the 6th of June after the documents in the drawer "6th" have been taken out and after the drawer "6th" has been marked for the next month July. The red stripe of labels now reaches as far as 6th of July. On the next day only the drawer 7th of June can be opened, emptied and marked for July. If by any mistake the drawer 8th instead of the drawer 7th should be emptied and its frame marked by a red label July, the outstanding white label June on the drawer "7th of June" between the red label "6th of July" and that by mistake changed "8th July" would immediately indicate the error.

When a new month has arrived, it is not necessary to take out all the documents kept in the relative monthly drawer and to rearrange them into the daily drawers. By means of the control labels already described, each document kept in any of the monthly drawers comes automatically and in time into the hands of the man working the device. It has been described how the day of maturity of any document placed in a monthly drawer is marked on the surface of the monthly drawer by change of the relative control label. For example a document maturing on the 12th of July has been placed in the monthly drawer "July" and its term marked on the latter by the control label "12th July" taken from the daily drawer "12th" and put into the slot "12" of the monthly drawer "July" (see Fig. 1). As the daily drawers in the month of June (Fig. 1) are day by day emptied out and their frames $f$ marked for the forthcoming month July, the day of the 12th of June arrives. After the documents of the daily drawer: "To be opened on the 12th of June" have been taken out and after the date in the date box $k$ (Figs. 1 and 2) has been changed, the emptied drawer "12th" should be marked for the next month July by changing the label in the frame $f$. But this label is missing in the daily drawer "12th" because it has been placed in the monthly drawer "July" when the document wanted on the 12th of July has been deposited there. This missing label shows distinctly that in the monthly drawer "July" there lies one or more documents wanted on the 12th of July and the man working the device will not only take out the missing label to mark the daily drawer for the month July, but he also will take out the documents maturing on the 12th of July and put them into their proper daily drawer just emptied and prepared for the 12th of July. This transposal of any document occurs just one month before its maturity and no document kept in any monthly drawer can be forgotten. But let us suppose that the man working the device, after having placed a document in a monthly drawer, has forgotten to mark this drawer with the label bearing the day and month of maturity. Even in this case a timely transposal of these documents is secured. At the beginning of a new month it is necessary to change the name of the month in the date box $k$ (Figs. 1 and 2) and to take out the relative board from the monthly drawer. On this occasion the monthly drawer must be found empty and for the changing of the name takes place on the 1st day of every month, any documents left in this drawer will be found in time, in spite of all errors or omissions.

By means of this combination of labels and of specially adapted drawers the device controls exactly the work of the man using it, enables the whole office staff to participate in this control and shows by the labels placed in the front boards of the monthly drawers the state of all coming terms, their frequency over a certain period and their distribution for the whole year.

I am aware that prior to my invention there have been several similar devices containing daily and monthly drawers. I therefore do not claim such a combination broadly; but

I claim:

1. The combination in a term recorder of daily drawers provided with means for holding control labels, and control labels arranged in rows, each row on a drawer, and capable of being removed individually and placed in the holding means of a daily drawer to display the name of the month it belongs to, substantially as described.

2. In a term recorder, the combination of 31 daily drawers provided with means for holding control labels, and a set of 366 control labels arranged in 31 rows, each row on one of the 31 daily drawers, each control label being individually capable of removal from its respective row and placed in the holding means on the front surface of a daily drawer to expose the name of the month it belongs to, substantially as described.

3. In a term recorder, the combination of daily drawers provided with control label holding means at their front ends, one or more monthly drawers, and a set of control labels arranged in rows and capable of being individually removed and placed either on the front surface of a monthly drawer or in the holding means on a daily drawer to expose when in the latter position the name of the month it belongs to, substantially as described.

4. In a term recorder, the combination of 31 daily drawers provided with control label holding means at their ends, 12 monthly drawers, and 366 control labels arranged in 31 rows, each row on the front surface of one of the 31 daily drawers, each control label being removable individually and adapted to be placed in the holding means of a daily drawer, in the latter position displaying thereon the name of the month they belong to, each control label being also adapted to be placed in the holding means of a monthly drawer, substantially as described.

5. The combination in a term recorder of daily drawers provided with means for holding control labels, and a set of 366 control labels arranged in 31 rows, each row on one of the 31 daily drawers, each control label being individually capable of removal from its respective row and placed in the holding means on the front surface of a daily drawer to expose the name of the month it belongs to, the labels of each respective month being also arranged in vertical rows, the control labels for odd and even months respectively differing from each other in appearance, substantially as described.

6. In a term recorder, the combination of 31 daily drawers provided with means for holding control labels, and a set of 366 control labels arranged in 31 horizontal rows, each row on one of the 31 daily drawers, each control label being individually capable of removal from its respective row and placed in the holding means on the front surface of a daily drawer in vertical alinement with the other labels to expose the name of the month it belongs to, the control labels for odd and even months respectively differing from each other in appearance, substantially as described.

7. In a term recorder, the combination of daily drawers provided with control label holding means at their front ends, one or more monthly drawers, and a set of control labels arranged in horizontal rows and capable of being individually removed and placed either on the front surface of a monthly drawer or in the holding means on a daily drawer to expose when in the latter position the name of the month it belongs to, the labels of each respective month being also arranged in vertical rows, the control labels for the odd and even months respectively differing from each other in appearance, substantially as described.

8. In a term recorder, the combination of 31 daily drawers provided with control label holding means at their ends, 12 monthly drawers, and 366 control labels arranged in 31 rows, each row on the front surface of one of the 31 daily drawers, each control label being removable individually and adapted to be placed in the holding means of a daily drawer, in the latter position displaying thereon the name of the month it belongs to, each control label being also adapted to be placed in the holding means of a monthly drawer, the control labels for the odd and even months respectively differing from each other in appearance, substantially as described.

9. In a term recorder, the combination of daily drawers each provided with a series of slots in its front surface and with control label holding means; and a set of control labels arranged in rows, each row on the front surface of one of the daily drawers, each control label being placeable in a slot in a drawer and provided with a handle projecting out of the slot and bearing the label's date, said labels being capable of being individually removed and located in the holding means on a daily drawer to display the name of the month it belongs to, substantially as described.

10. In a term recorder, the combination of daily drawers each provided with a series of slots in its front surface and with control label holding means; one or more monthly drawers each provided with a series of slots in its front end, and a set of control labels arranged in rows, each row on the front surface of one of the daily drawers, each control label being placeable in a slot in a daily drawer and provided with a handle projecting out of the slot and bearing the label's date, said labels being capable of being individually removed and located either in a slot in a monthly drawer or in the holding means on a daily drawer, substantially as described.

11. In a term recorder, the combination of daily drawers each provided with a series of slots in its front surface and with control label holding means; and a set of control labels arranged in rows, each row on the front surface of one of the daily drawers, each control label being placeable in a slot in a drawer and provided with a handle projecting out of the slot and bearing the label's date, said labels being capable of being individually removed and located in the holding means on the daily drawers and displaying the name of the month it belongs to, the labels that belong to the odd and even months respectively differing from each other in appearance by being alternately colored, substantially as described.

12. In a term recorder, the combination of daily drawers each provided with a series of slots in its front surface and with control label holding means; one or more monthly drawers each provided with a series of slots in its front end, and a set of control labels arranged in rows, each row on the front surface of one of the daily drawers, each control label being placeable in a slot in a daily drawer and provided with a handle projecting out of the slot and bearing the label's date, said labels being capable of being individually removed and located either in a slot in a monthly drawer or in the holding means on a daily drawer, or in a slot in a daily drawer, the labels that belong to the odd and even months respectively differing from each other in appearance by being alternately colored, substantially as described.

13. The combination in a term recorder of daily drawers provided with means for holding control labels, and control labels arranged in rows each row on a drawer, and capable of being removed individually, and placed in the holding means of a daily drawer, to display the name of the month it belongs to, and means whereby said control labels can be checked or locked in their slots in the daily drawers so that any label belonging to a Sunday, a holiday or another non-working day can be beforehand rendered temporarily unusable, substantially as described.

14. In a term recorder, the combination of 31 daily drawers provided with means for holding control labels, and a set of 366 control labels arranged in 31 rows, each row on one of the 31 daily drawers, the control labels being individually capable of removal from its respective row and placed in the holding means on the front surface of a daily drawer to expose the name of the month it belongs to, and means whereby said control labels can be checked or locked in their slots in the daily drawers so that any label belonging to a Sunday, a holiday or another non-working day can be beforehand rendered temporarily unusable, substantially as described.

15. In a term recorder, a set of date plates, and drawers provided with cavities in their inner bottoms in which the respective date-plates are placed so that said plates will be covered by documents lying in the drawers and a date plate cannot be readily removed from a drawer unless the overlying documents are taken out of the drawer, substantially as described.

AUGUST ZITZMANN.

Witnesses:
GEORG REIF,
FRANK BOHR.

Copies of this patent may be obtained for five cents each, by addressing the "Commissioner of Patents, Washington, D. C."